No. 716,021. Patented Dec. 16, 1902.
W. F. FOLMER.
PHOTOGRAPHIC CAMERA.
(Application filed Feb. 17, 1902.)
(No Model.) 4 Sheets—Sheet 1.

WITNESSES:

INVENTOR
William F. Folmer
BY
ATTORNEYS

No. 716,021. Patented Dec. 16, 1902.
W. F. FOLMER.
PHOTOGRAPHIC CAMERA.
(Application filed Feb. 17, 1902.)
(No Model.) 4 Sheets—Sheet 2.

WITNESSES:

INVENTOR
William F. Folmer
BY
ATTORNEYS

No. 716,021. Patented Dec. 16, 1902.
W. F. FOLMER.
PHOTOGRAPHIC CAMERA.
(Application filed Feb. 17, 1902.)
(No Model.) 4 Sheets—Sheet 3.

WITNESSES
Geo. W. Taylor.
Fred Acker

INVENTOR
William F. Folmer
BY
Munn & Co
ATTORNEYS.

No. 716,021. Patented Dec. 16, 1902.
W. F. FOLMER.
PHOTOGRAPHIC CAMERA.
(Application filed Feb. 17, 1902.)

(No Model.) 4 Sheets—Sheet 4.

WITNESSES:

INVENTOR
William F. Folmer
BY Munn & Co
ATTORNEYS.

UNITED STATES PATENT OFFICE.

WILLIAM F. FOLMER, OF NEW YORK, N. Y.

PHOTOGRAPHIC CAMERA.

SPECIFICATION forming part of Letters Patent No. 716,021, dated December 16, 1902.

Application filed February 17, 1902. Serial No. 94,475. (No model.)

*To all whom it may concern:*

Be it known that I, WILLIAM F. FOLMER, a citizen of the United States, and a resident of the city of New York, borough of Manhattan, in the county and State of New York, have invented a new and Improved Photographic Camera, of which the following is a full, clear, and exact description.

My invention relates to photographic cameras, particularly reflex cameras; and the purpose of the invention is to provide for automatically setting the shutter while depressing the mirror and making the exposure automatically when the mirror is released.
Another purpose of the invention is to provide means for automatically opening the diaphragm to a full aperture when setting the mirror and permitting the operator to diaphragm the lens to whatever stop it may be desirable to use.

Further objects of the invention are to provide an automatically-folding self-contained focusing-hood, means for insuring the box being light-proof during the manipulation of the mirror and the operations of focusing and exposing the plate, and also to provide side arms for guiding the front in its outward movement.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
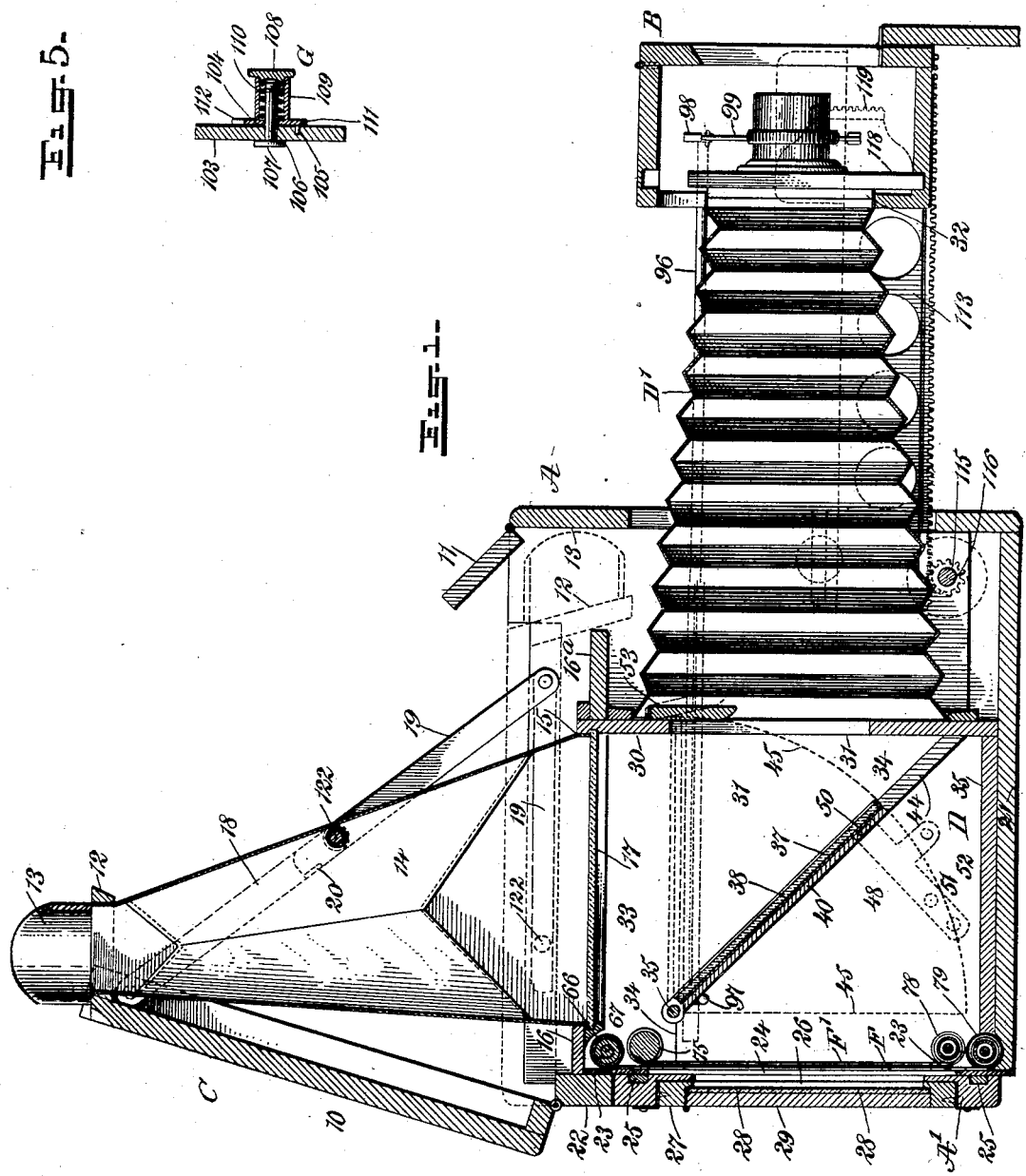
Figure 2:
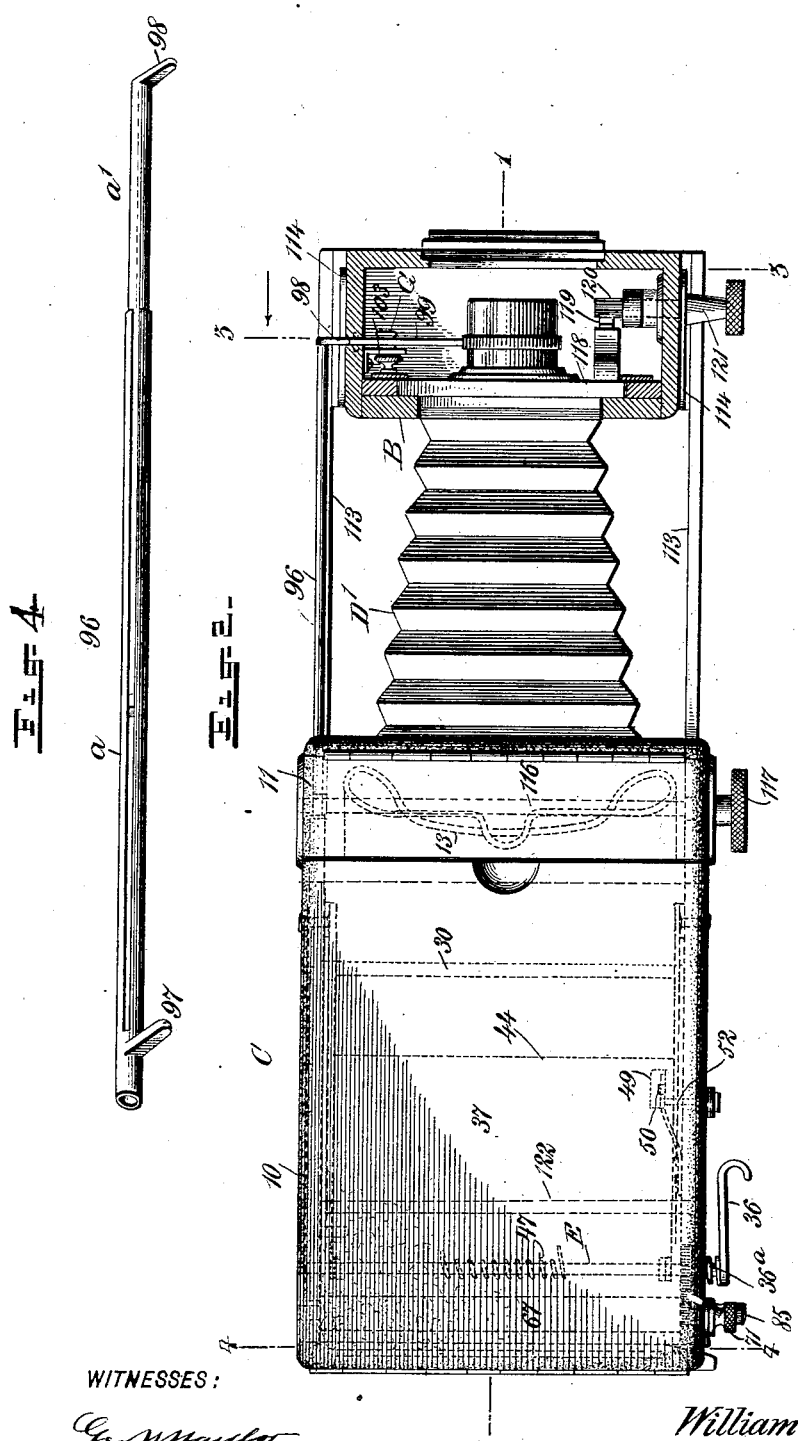
Figures 3, 8:
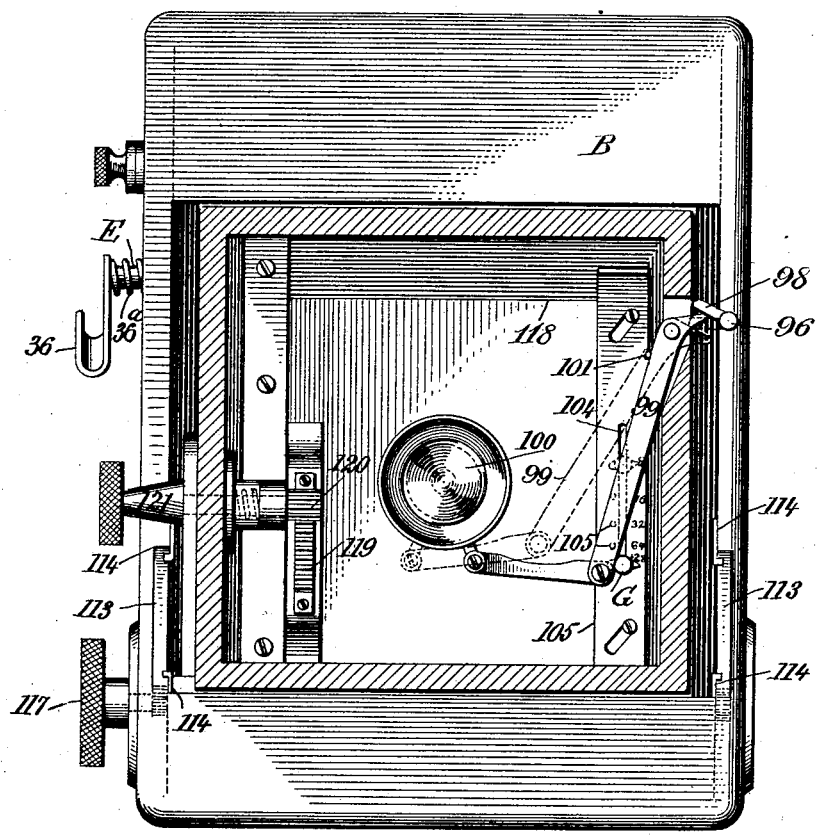
Figure 6:
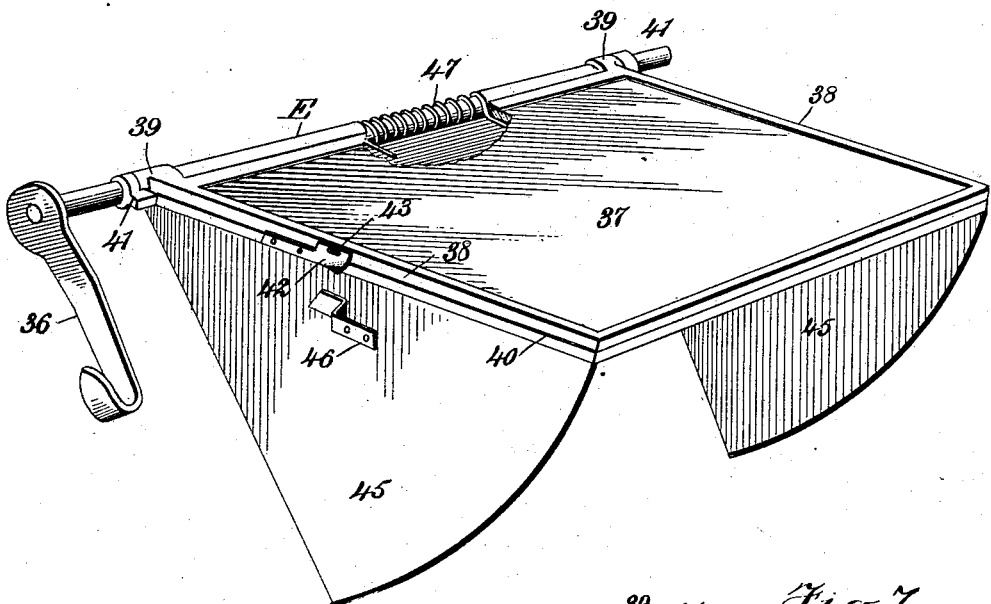
Figure 7:
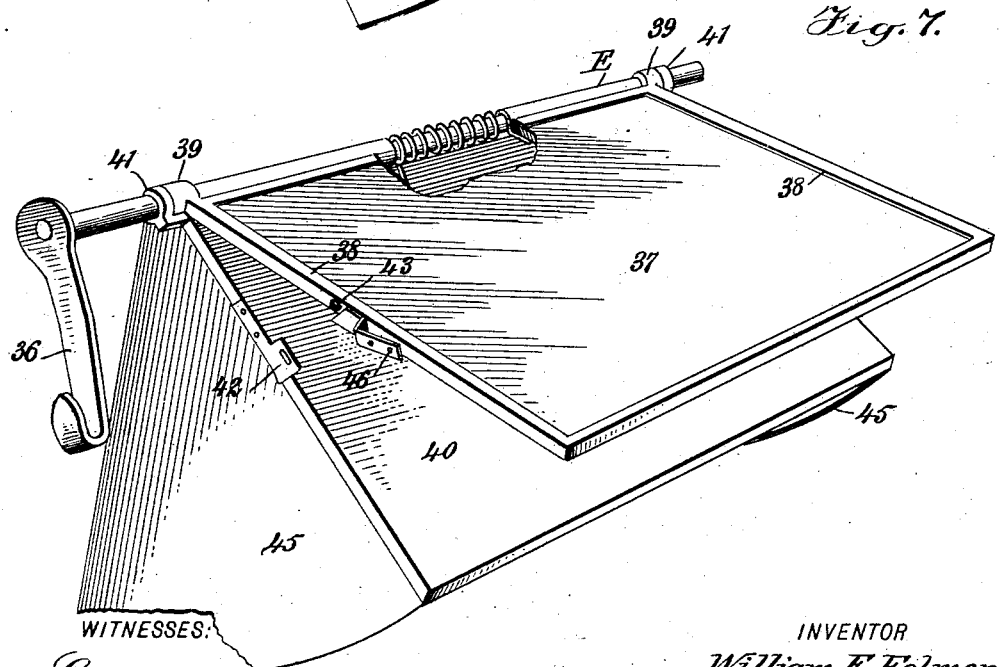

Figure 1 is a longitudinal vertical section through a camera having the improvements applied, the section being practically on the line 1 1 of Fig. 2. Fig. 2 is a plan view of the camera, the front being in horizontal section. Fig. 3 is a vertical section taken practically on the line 3 3 of Fig. 1. Fig. 4 is a detail perspective view of the rod for opening the diaphragm of the lens to its full extent when the mirror is set and which is operated by the controlling mechanism of the mirror. Fig. 5 is a detail view of the spring-button for manually controlling the lens-diaphragm; and Fig. 6 is a perspective view of the focusing-mirror and light obstructing or excluding board in their locked position, a portion of the mirror being in section. Fig. 7 is a view similar to Fig. 6, the focusing-mirror and light obstructing and excluding board being, however, shown separated; and Fig. 8 is a detail vertical section through a portion of the camera-box and through the focusing-mirror and light obstructing or excluding board.

A represents the box, and B the movable front, of the camera. The box is provided with an upper cover C in two sections 10 and 11, the sections being hinged one to the front and the other to the rear portion of the box. The section 10 is the larger and main section, and when closed upon the box the smaller section 11 closes against it. At the end of the main cover-section 10 opposite the hinge a downwardly-extending flange 12 is formed, having an opening therein surrounded at the outer face of the flange by an eye-shield 13, and within this opening the upper end of a collapsible focusing-hood 14 is secured to the walls of the opening 15, produced in a horizontal partition 16, located in the upper portion of the box near the top. This partition extends from the back wall of the box to a point near its forward wall, as is shown in Fig. 1, and at the opening 15 a ground glass 17 is held in any approved manner. The main section 10 of the cover C is shown held open by pivotally-connected links 18 and 19, pivoted to the cover-section 10 and to the inner side face of the box, one link having a stop 20 to engage with the other link when the links are in the same longitudinal plane. The bottom 21 of the box does not extend quite as far rearward as the top back portion, whereby an overhanging section 22 is provided, as is shown in Fig. 1, upon which the section 10 of the cover is hinged. A plate 23 extends up from the bottom of the back of the box to the rear face of the overhanging section 22 and usually to a contact with the upper partition 16, said plate having an opening 24 therein of predetermined size. At the outer face of the plate ribs 25 are formed around the opening 24.

The camera is provided with a reversible back A', having grooves in its inner face to receive the ribs 25 in a light-tight manner. An opening 26 is produced in the back for the exposure of a plate or film, and a rabbet is formed exteriorly in the back around the opening to receive a frame 27, carrying a ground glass 28, between which frame and the outer face of the back of the box the plate-holder is to be introduced, the frame 27 being spring-controlled in its forward-and-rearward movement, as is customary, to admit of the introduction of the plate-holder and to retain the same in position. The frame 27 back of the plate-holder is provided with a hinged or removable backboard 29, so that the rear ground glass may be used for focusing when desired.

A rear chamber D is formed in the box A by carrying the front partition upward from the bottom 21 to the upper partition 16, preferably to that point where the forward lower portion of the focusing-head 14 is secured, thus obtaining an extension $16^a$ of the upper partition 16 beyond the front of the chamber D, which extension $16^a$ engages with the flange 12 of the cover-section 10 when the latter is closed, as is shown in dotted lines in Fig. 1, and also serves to shut light from an opening 31, produced in the front partition 30. The bellows B' is suitably secured to the front of the vertical partition 30 around the opening therein, the opposite end of the bellows being shown secured to the walls of an opening 32 in the rear portion of the sliding front B.

The rear chamber D is provided with an auxiliary bottom 35 for strengthening purposes and with inner side walls 34, removed a slight distance from the main side walls 33; but the auxiliary side walls 34, while extending from the bottom of the chamber D, terminate short of the top of the chamber, usually about on a line with the upper wall of the opening 31 at the front of the chamber, as is shown in Fig. 1.

A shaft E is journaled in the side walls of the chamber D at its upper rear portion, as is shown in Figs. 1 and 2. This shaft extends beyond one side of the body A and at that end is provided with a handle 36, and a spring $36^a$ is attached to the shaft and box in such a manner as to turn the shaft E in an upward direction after the shaft has been turned downward and released or at such time to carry the handle 36 from a lower to the upper position.

A focusing-mirror 37, set in a suitable frame 38, is secured by knuckles 39 or otherwise to the shaft E, as is shown in Figs. 6 and 7, and the mirror and its frame normally rest upon a light-obstructing board 40, having knuckles 41 or their equivalents (see Figs. 6 and 7) loosely mounted upon the shaft E. The mirror-frame and the light-obstructing board are normally held in close relation usually by a spring latch-plate 42, secured to one side edge of the board 40, having its front end outwardly curved, as is shown in Fig. 6, which latch-plate near its free or curved end is provided with a slot to receive a stud 43, carried by the mirror-frame. When the mirror is in use for focusing, it occupies the downwardly-inclined position (shown in Fig. 1) in longitudinal alinement with a similarly-inclined partition 44 at the lower front portion of the chamber D, and as the shaft E is at a point in line with or slightly above the upper wall of the front opening 31 of said chamber and the upper edge of the lower partition 44 is about on a line with the lower edge of said opening when the mirror and light-obstructing board are in their lower position engaging the lower partition 44 the exposed plate in the plate-holder will be perfectly shielded from light from the front; but in order to insure a perfectly light-proof box shields 45, of any suitable material, are secured to the side edges of the light-obstructing board, as is shown in Figs. 1, 6, and 7, and these shields move in the spaces between the outer and auxiliary side walls of the mirror or focusing-chamber D. After focusing and just before an exposure the mirror and the light-obstructing board are automatically carried to and take the upper position. (Shown in dotted lines in Figs. 1 and 6.) When the mirror is to be used for focusing, it and the light-obstructing board are carried downward by moving the handle 36 of the shaft E in that direction, and in order that all light from the front shall be cut off from the back as soon as possible the light-obstructing board in its downward movement is separated from the mirror-frame and drops quickly in advance of the mirror-frame. The board 40 is separated from the mirror-frame through an arm 46, secured to the main side 33 of the chamber D, as is shown in Fig. 5, which arm occupies such a position that as the board and mirror-frame descend one end of the arm will engage with the inner face of the front curved end of the latch 42 and disengage the latch from the keeper 43 on the mirror-frame. At such time the board, which is loosely mounted on the shaft E, is forced downward by the action of a spring 47, coiled around the shaft E, as is shown in Fig. 2, and having bearing at its ends, respectively, in a downward direction against the upper face of the light-obstructing board and in an upward direction against the under surface of the mirror-frame, the said spring 47 acting to force the light-obstructing board downward from the mirror-frame when the locking engagement between the two said parts is broken. When the light-obstructing board reaches its lowest position, (shown in positive lines in Fig. 1,) it is held in such position by a spring-latch 48, secured at one end to the lower portion of the outer face of an auxiliary side wall 34, and the upper end of the spring-latch 48, passing through the auxiliary side wall 34, enters an opening 49 in the light-obstructing board, as is shown in Fig. 2, and the upper end of said latch 48 is provided with an aperture adapted to receive a stud 50, projecting from a wall of the opening 49 when the light-obstructing board reaches its lowest position. As the handle 36 of the shaft E is carried farther downward the mirror-frame is brought in contact with the upper face of the light-obstructing board and is again connected therewith by the latch devices 42 and 43, so that when the lower latch 48 is disengaged from the board 40 the spring 36ª, controlling the upward rotation of the shaft E, will immediately act to carry the connected mirror and board to the upper position, (shown in dotted lines in Fig. 1,) and at this time an exposure of the plate or film occurs, as will be hereinafter explained, the shutter being automatically brought into action across the plate through the upward revolving movement of the shaft E. The lower latch 48 is released from engagement with the light-obstructing board 40 through the medium of the push-button 52, operated from the outside of the box and shown in Fig. 1 as connected with the extension 51 from the latch. In order to prevent any leakage of light to the plate as the mirror and board ascend, a curtain-strip 53 is secured to the front face of the partition 30 above the upper edge of the opening 31 therein, the curtain-strip extending downward some distance in front of the said opening.

In connection with the camera-box I have shown in Fig. 1 a curtain-shutter which is the subject-matter of patents granted to me November 5, 1901, No. 686,045, and August 5, 1902, No. 716,507, which shutter, briefly, consists of upper rollers 67 and 75 and corresponding lower spring-rollers 78 and 79. The upper roller 67 and the lower roller 79 are respectively distributing and receiving rollers for the rear curtain F of the shutter, and the upper roller 75 is the receiving-roller, and the the lower roller 78 the distributing-roller, for the forward curtain F' of the shutter, which shutter consists, primarily, of the said two curtains. Connections are made between the mirror-frame and the shutter to automatically set the shutter while depressing the mirror and make an exposure automatically through the movement of the mirror from focusing position, which is preferably accomplished by suitable gear connection between the shaft E and one of the upper-roller shafts of the shutter.

When the mirror 37 is brought into focusing position, it causes the diaphragm of the lens to be automatically brought to a full opening. This is accomplished through the medium of the actuating-arm 96, which is held to turn in a suitable space made in the inner face of one side section of the box, as is shown in Fig. 2, and, as illustrated in Fig. 4, this arm is made in two telescopic sections $a$ and $a'$, which while sliding freely one in the other turn together. The inner end of the section $a$ of the actuating-arm 96 is provided with a crank member 97, which extends within the mirror-chamber D in the downward path of the light-obstructing board 40, as is shown in Fig. 1, so that the said crank member 37 is depressed when the board 40 reaches its lowermost position, causing the actuating-arm to rock, and a second crank member 98 at the outer end of the section $a'$ of said arm 96 will also be depressed, as is shown in dotted lines in Fig. 3, and will engage with and depress an elbow-lever 99, fulcrumed at the front B, causing said lever, which is pivotally connected with the diaphragm of the lens 100, to open the diaphragm to its full extent, as is also shown in Fig. 3. The lever 99 when thus operated places the controlling-spring 101 under tension, and the spring serves to carry the lever 99 in a direction outward to close the diaphragm when the light-obstructing board 40 commences to ascend, thus releasing the operative parts of the board and mirror from such extra duty. As the lever 99 returns to its normal position it will engage with a stop G, previously set in the diaphragm-plate 103 at the front B, so that the lens is automatically diaphragmed as desired before the exposure takes place. Preferably the diaphragm-plate is provided with a longitudinal slot 104, crossed by the lever 99, as is shown in Fig. 3, and apertures 105 are produced at one side of the slot, and corresponding stop members appear upon the plate 103 at the opposite side of the slot.

The stop G is preferably constructed as shown in Fig. 11 and consists of a pin 106, which is freely passed through the slot 104 in the diaphragm-plate 103. This pin is provided with a fixed head 107 at the rear of the said plate 103, but is threaded at its outer end to receive a nut. A barrel 109 is loosely passed around the pin, the inner end of the barrel being permanently closed except where the pin 106 passes through, while the outer end of the barrel is closed by a cap 108, preferably screwed therein, and a spring 110 is coiled around the pin 106, bearing against the inner head of the barrel and against the said nut. At one side of the barrel a projection is formed, carrying a stud 111, adapted to enter any one of the apertures 105 in the diaphragm-plate 103, and at the opposite side of the barrel a pointer 112 is located, adapted to engage the member corresponding to the aperture in which the stud 111 is entered. The stop G may be readily moved up and down the diaphragm-plate by simply drawing the barrel 110 outward to remove the stud 111 from the aperture into which it may have been placed.

Side bars 113 are secured to the side portions of the front B, provided with rack-teeth in their under edges, which side bars slide in suitable grooves in the sides of the box A. Each side bar 113 is provided also with upper and lower longitudinal grooves at their inner faces, receiving the horizontal members of angle-strips 114, secured to the inner faces of the side sections of the box, as is shown in Fig. 3, whereby the front is guided in its outward and inward movement and is held against vertical and lateral displacement. The front is carried to and from the box A through the medium of pinions 115, secured to the shaft 116, mounted in the forward lower portion of the box and provided at one end with the usual finger-piece or knob 117.

A lens-board 118 is raised and lowered by securing a rack 119 to its front face, as is shown in Fig. 3, which rack is engaged by a pinion 120, carried by a tension-controlled shaft 121.

I desire it to be understood that the links 18 and 19 are in duplicate, being at each side of the hood 14, and that the pivotal connection between the links at both sides of the hood consists of a rod 122, which when the hood is up or in position for focusing engages with the front central portion of the hood, so that when the section 10 of the cover C is to be lowered it is simply necessary to push the rod 122 rearward, which action will break the joints between the links 18 and 19, and the rod by being brought in rearward contact with the hood will serve to automatically fold the hood upon itself, so that it may readily assume its proper folded position in the box A.

In the operation of the camera the curtains of the shutter are adjusted through the medium of the shaft 66 to obtain the desired opening in the shutter, and the tension is set to obtain the requisite speed of the shutter. The front B may now be advanced by manipulating the shaft 116, and the stop device G is set in position upon the diaphragm-plate 103, and either then or after the above-named adjustments the focusing-hood is elevated, as is shown in Fig. 3, and the plate-holder is placed in position at the rear of the mirror-chamber D. The handle 36 is now carried downward, whereupon the light-obstructing board 40 is released from the mirror 37 and is quickly carried to its lower inclined position by the spring 47, preventing any light from the front reaching the rear portion of the mirror-chamber, and at the same time the actuating-arm 96 is operated upon to cause a full opening at the lens. The mirror now reaches the light-obstructing board and is again locked thereto, the said board being retained in its lower position by the spring 48, and at this time the focusing operation is carried out. The slide is now drawn from the plate-holder and the button 52 is pressed, releasing the attached mirror and light-obstructing board, and these connected parts will be instantly carried upward by the spring 36ª of the shaft E, placed under tension when the handle 36 is carried down, and as the mirror ascends the spring 101, acting on the lever 99, connected with the diaphragm of the lens, will carry the actuating-arm 96 to its normal position, and the lever 99 will engage with the previously-set stop G, and thus bring about the desired opening at the lens.

Having thus described my invention, I claim as new and desire to secure by Letters Patent—

1. In cameras, a focusing-mirror and frame, and a light-obstructing board, a rocking support on which one is attached and on which the other is loosely mounted, a tension device between the mirror-frame and light-obstructing board, tending to separate the two, a latch connection between the mirror-frame and light-obstructing board, means in the path of the mirror and board for releasing the latch, and a device for automatically locking the light-obstructing board and mirror-frame in focusing position, which device is released from such locking engagement from the exterior of the camera-box.

2. In cameras, a spring-controlled shaft, a focusing-mirror and frame attached to the shaft, a light-obstructing board below the mirror, loosely mounted upon the shaft, and a tension device exerting pressure in opposite directions on the mirror-frame and light-obstructing board, a latch connection between the mirror-frame and board, a releasing device for the latch, a retaining-latch for the mirror-frame and board, adapted to hold the mirror in focusing position, and means for releasing the retaining-latch from the exterior of the camera-box, as set forth.

3. In cameras, a focusing-mirror and frame and a light-obstructing board having common support and arranged for connection and separation at different stages of their movements, and a tension device interposed between the mirror-frame and board, tending to separate such parts, substantially as described.

4. In a camera, a focusing-mirror and a co-acting light-obstructing board, said board being provided with attached light-obstructing shields, as set forth.

5. In cameras provided with a focusing-chamber and an opening at the rear of the chamber to receive plates or films for exposure, a spring-controlled shaft mounted in said chamber adjacent to and at a point above the upper wall of the plate-receiving opening, the said shaft being manually operated in one direction from the exterior of the camera-box, being spring-controlled in an opposite direction, a focusing-mirror and frame, an underlying light-obstructing board, the mirror being fixed to the shaft and the board loosely mounted thereon, a spring interposed between the mirror and board, tending to separate the two, a latch connection between the mirror and board, a releasing device for the latch, a retaining-latch attached to the sides of said chamber and arranged for automatic engagement with the said board when the board and mirror are in a lower position in the chamber and the mirror is in focusing position, and means, substantially as described, for releasing the retaining-latch, as set forth.

6. In cameras provided with a focusing-chamber and an opening at the rear of the chamber to receive plates or films for exposure, a spring-controlled shaft mounted in said chamber adjacent to and at a point above the upper wall of the plate-receiving opening, the said shaft being manually operated in one direction from the exterior of the camera-box, being spring-controlled in an opposite direction, a focusing-mirror and frame, an underlying light-obstructing board, the mirror-frame and being fixed to the shaft and the board loosely mounted thereon, a spring interposed between the mirror and board, tending to separate the two, a latch connection between the mirror-frame and board, a releasing device for the latch, a retaining-latch attached to the side of said chamber and arranged for automatic engagement with the said board when the board and mirror are in a lower position in the chamber and the mirror is in focusing position, means substantially as described, for releasing the retaining-latch, and light-obstructing shields carried by the light-obstructing board and arranged for movement between the main side walls of the chamber and inner auxiliary side walls thereof, as set forth.

7. In cameras, a diaphragm for the lens, and a focusing-mirror mounted for pivotal movement, and a connection between the mirror and diaphragm, whereby the diaphragm is operated through the movement of the said mirror, as set forth.

8. In cameras, a diaphragm for the lens, a lever connected with the diaphragm, a focusing-mirror mounted for pivotal movement, an actuating-arm capable of rocking movement, and extensions from the said arm, one of said extensions being in the downward path of the focusing-mirror and the other in engagement with the diaphragm-lever, whereby the lens-diaphragm is automatically operated to produce a full opening at the lens when the mirror is carried to focusing position, as specified.

9. In cameras, a diaphragm for the lens, a spring-controlled lever connected with the diaphragm, a diaphragm-plate and a stop adjustable on said plate in the path of the lever, a focusing-mirror mounted for pivotal movement, a telescopic actuating-arm capable of rocking movement and provided with crank extensions, one of which extensions is in the downward path of the mirror, the other extension having engagement with the said diaphragm-lever, whereby when the mirror is brought to focusing position the diaphragm of the lens is fully opened, and when the mirror is returned from focusing position the lens-diaphragm is automatically set for an exposure, as described.

10. In cameras, a lever, a diaphragm therefor, an operating-lever for the diaphragm, a diaphragm-plate, a manually-operated stop adjustable upon said plate in the path of the diaphragm-lever when moving in a direction to close the lens-diaphragm, a focusing-mirror mounted in the camera-box, and an actuating-arm mounted to rock in the said box, which arm is telescopic, being acted upon by the mirror in its movement to focusing position and released when said mirror returns from said position, said arm being in operative connection with the diaphragm-lever, as described.

11. In cameras, a curtain-shutter, a pivotally-mounted focusing-mirror, manually operated in one direction and spring-operated in the other direction, and connections between the mirror and shutter, substantially as described, whereby to automatically set the shutter while depressing the mirror and make an exposure automatically through the movement of the mirror from focusing position.

12. In cameras, a curtain-shutter, a pivotally-mounted focusing-mirror manually operated in one direction and spring-controlled in the opposite direction, a lens and a spring-controlled diaphragm therefor, a mechanism substantially as described for setting the shutter while depressing the mirror and making an exposure automatically through the movement of the mirror from focusing position, and a connection between the mirror and the lens-diaphragm, whereby the diaphragm is set fully open through the movement of the mirror to focusing position, and the spring of the diaphragm is free to act to stop the lens when the mirror returns from its focusing position and just before the time the exposure is made, as described.

13. In cameras, a focusing-mirror having a light-obstructing board arranged for locking engagement therewith and to drop in advance of the mirror when the latter is being carried to focusing position, as set forth.

14. In cameras, a folding focusing-hood, and means operated by the movement of the cover of the camera-box for automatically opening the hood when the cover is raised and automatically folding the hood when the cover is closed, substantially as described.

15. In cameras, a camera-box having an opening leading to its interior, and a cover to close over the said opening, a folding focusing-hood secured at one end to the walls of said opening and attached at its opposite end to the cover, pivotally-connected links at each side of the hood pivotally attached to the box and cover, and a rod constituting a pivotal connection between both sets of links and engaging transversely with the hood for the purpose of folding the same and placing the links of the sets at angles to each other, substantially as described.

In testimony whereof I have signed my name to this specification in the presence of two subscribing witnesses.

WILLIAM F. FOLMER.

Witnesses:
J. FRED. ACKER,
JNO. M. RITTER.